L. TYLER.
Fertilizer.
No. 25,064.
Patented Aug. 9, 1859.
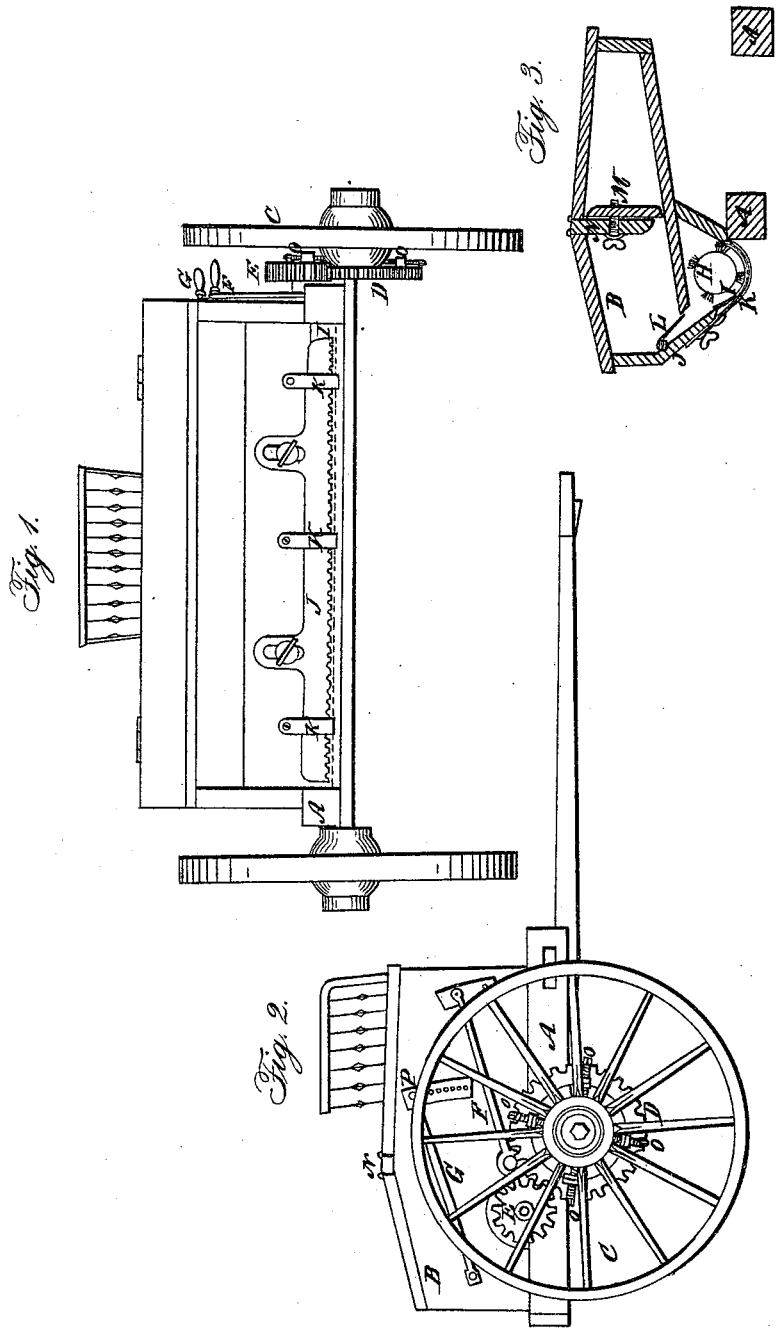
Inventor:
Charles Cooke
Charles Ketchum
Witnesses:
Lorenzo Tyler

UNITED STATES PATENT OFFICE.

LORENZO TYLER, OF HAVANA, NEW YORK.

IMPROVEMENT IN MACHINES FOR SOWING FERTILIZERS.

Specification forming part of Letters Patent No. 25,064, dated August 9, 1859.

*To all whom it may concern:*

Be it known that I, LORENZO TYLER, of Havana, in the county of Schuyler and State of New York, have invented a new and useful Machine for Sowing Fertilizers; and I do hereby declare that the following is a full, clear, and exact description of the construction and operation of the same, reference being had to the accompanying drawings, making a part of this specification, in which—

Figure 1 is a rear view of the whole machine. Fig. 2 is a side elevation of the same, and Fig. 3 is a transverse section of the internal parts of the machine.

The letters of reference refer to the same parts in each figure.

A is the frame that supports and keeps the whole of the parts together. The size and manner of construction may be varied to suit the maker or user.

B is the box or receptacle for the fertilizer and means used to distribute the same. The size is made to suit the frame upon which it rests. The forward part is the place to put the fertilizer—such as plaster or lime—and the same is allowed to pass to the rear portion, as required for distributing.

C is a supporting and driving wheel that drives the distributing-cylinder. There is nothing peculiar in its construction, for any kind of carriage-wheel will answer the same purpose if it will fit the axle.

D is the driving-wheel, made without a hub or arms, except the bolts O, O, O, and O, that are made to pass through projections on the side of the rim of the wheel and extend toward the center, so that with them the wheel may be fastened to the hub of any size or kind that is made like hubs of ordinary carriage-wheels.

E is a pinion. It is attached to the end of the distributing-cylinder to turn the same.

F is a lever pivoted to the side of the box, and is used to raise the pinion E from the wheel D.

G is a winch attached to the axis of the valve L. At the extremity is a point and handle. The point may be put into any one of the holes in the plate P. By this the valve is changed or closed or opened when required to aid in regulating the quantity that is being sown.

H is the distributing-cylinder, made with four or more rows of brush made of bristles or other equivalents, so arranged as to sweep over the concave I when the cylinder is revolving, thereby keeping the holes in the concave from being clogged.

I is a concave, made of any kind of sheet metal. It is perforated, so as to let the fertilizer pass through. The concave may be made with holes large or small to suit the kind of fertilizer to be sown, or may be made of wire, as a screen. The box has an aperture in the side large enough to allow the cylinder to be withdrawn, so that it may be repaired, if needed, without taking the box apart and allow any substance to be taken from the concave that would not pass through it.

J is an adjustable slide, with the lower edge serrated so as not to cover all the holes in one row when the holes of the concave are in rows. It may be moved up or down, so as to cover as much of the concave as is required, so as to allow the proper quantity to pass through the concave, thereby regulating the quantity.

K, K, and K are clasps or supports for the concave, and are better to be flexible. The inner ends are fastened to the box, and may also be bent, as a hook, at the end to hold the concave from being turned with the cylinder. The other end is held with thumb-screws or other device that may readily be loosened when necessary to take off the concave. They also keep the slide J close to the outside of the concave.

L is a valve to regulate the quantity that passes into the concave, also to close the aperture and prevent sowing while moving the machine from place to place. It is pivoted at each end. At one end is the winch G that actuates it.

M is an adjustable slide attached to the partition of the box, and made so as to close the passage from the forward to the hind part when required.

N is the partition between the forward and hind portions of the box, and does not extend to the bottom, and has apertures and thumb-screws to hold the slide M in position.

O, O, O, and O are screw-bolts, that pass through the projections on the side of the wheel D, and extend to the hub of the wheel used, so that the wheel D may be applied to any carriage-wheel.

P is a plate attached to the side of the box, with a series of holes to regulate the position of the valve L.

To use my invention, put the fertilizer into the forward part of the box and raise the slide M, open the valve L, and adjust the slide J, and proceed, and find by trial the quantity that is being sown.

What I claim as my invention, and desire to secure by Letters Patent, is—

The arrangement of the frame A, hopper B, partition N, adjustable slide M, valve L, cylinder H, concave I, adjustable slide J, and flexible clasps K, the whole being constructed and operated as and for the purpose set forth.

LORENZO TYLER.

Witnesses:
   CHARLES COOK,
   CHARLES KETCHEM.